United States Patent
Sugimune et al.

(10) Patent No.: US 7,553,581 B2
(45) Date of Patent: Jun. 30, 2009

(54) SEALED PRISMATIC BATTERY

(75) Inventors: Naoto Sugimune, Ibaraki (JP); Yoshiki Somatomo, Ibaraki (JP); Toshiya Takaishi, Ibaraki (JP); Shota Aoki, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 0 days.

(21) Appl. No.: 10/990,481

(22) Filed: Nov. 18, 2004

(65) Prior Publication Data
US 2005/0136323 A1    Jun. 23, 2005

(30) Foreign Application Priority Data
Nov. 21, 2003  (JP)  ............................ P2003-392558
Jul. 6, 2004   (JP)  ............................ P 2004-198735

(51) Int. Cl.
*H01M 10/34*   (2006.01)
(52) U.S. Cl. ............................. 429/57; 429/61; 429/88; 429/163; 429/175; 429/185
(58) Field of Classification Search ................. 429/180, 429/185, 57, 61, 88, 163, 175
See application file for complete search history.

(56) References Cited
FOREIGN PATENT DOCUMENTS

| | | | |
|---|---|---|---|
| JP | 9-259842 A | 10/1997 | |
| JP | 2001-43845 A | 2/2001 | |
| JP | 2001-135358 A | 5/2001 | |
| JP | 2001-307705 A | 11/2001 | |
| JP | 2002-033091 A | 1/2002 | |
| JP | 2003-17029 A | 1/2003 | |
| JP | 2003-346742 A | 12/2003 | |
| KR | 2001-0047791 A | 6/2001 | |

*Primary Examiner*—Jane Rhee
(74) *Attorney, Agent, or Firm*—Birch, Stewart, Kolasch & Birch, LLP

(57) ABSTRACT

A sealed prismatic battery is provided. The battery includes a battery casing 4 having a prismatic cylindrical shape of body with a bottom part and an upper opening, and a lid 5 which fits in the upper opening of the battery casing. The opening of the casing body 4 and the lid 5 have laterally long shape in which the back-and-forth width dimension is smaller than the lateral length. The outer periphery of the lid 5 being welded to the periphery of the upper opening of the battery casing 4 to form a welded portion. The welded portion includes a pair of fragile parts 11 having low weld strength and formed at the ends of two long sides 10*a* and 10*b* of the welded portion which are parallel to each other, respectively, The battery is appropriately prevented from exploding and strength of battery is sufficiently provided against an impact caused by fall or the like.

2 Claims, 7 Drawing Sheets

SEALED PRISMATIC BATTERY

BACKGROUND OF THE INVENTION

1. Field of the Invention

The present invention relates to sealed prismatic battery such as a lithium ion secondary battery.

2. Description of the Background Art

Japanese Laid-Open Patent Publication No. 2001-43845 (paragraph numbers 0009-0011, FIG. 1), Japanese Laid-Open Patent Publication No. 2003-17029 (paragraph numbers 0015-0020, FIGS. 1 and 5), Japanese Laid-Open Patent Publication No. 9-259842 (paragraph numbers 0021-0023, FIGS. 2 and 5) and Japanese Laid-Open Patent Publication No. 2001-135358 (paragraph numbers 0029-0030, FIG. 4) disclose an sealed prismatic battery in which a lid is fit in an opening upper end of a prismatic cylindrical battery casing, and an outer periphery of the lid and an opening periphery of the battery casing are welded hermetically with laser.

According to the Japanese Laid-Open Patent Publication No. 2001-43845 and Japanese Laid-Open Patent Publication No. 2003-17029, when the lid and the battery casing are welded, weld strength at a part of a welded portion is lowered as compared with other parts of welded portion. Thus, when battery internal pressure is abnormally increased because of gas generated by overcharge or the like and the battery is swollen, the part having lower weld strength is broken prior to the other parts and the gas in the battery is discharged from the broken part. Thus, the battery is prevented from exploding.

According to the Japanese Laid-Open Patent Publication No. 2001-43845, the parts having lower weld strength are provided at two positions at the center of the lateral parts on a battery upper face so as to be opposed each other, and the above parts are in close vicinity of an output terminal such as a negative terminal provided at the center of the battery upper face. The output terminal projects from the battery upper face and is likely to hit on a floor when the battery is dropped by accident. In this case, the center of the battery upper face is largely bent and the part having lower weld strength could be easily broken.

In addition, when the battery is left unused for a long period, gas is stored in the battery and front and rear walls of the battery having a larger area are pressed outwardly. At this time, since stress is converged to the center of the battery upper face, the part having lower weld strength could be broken.

According to the Japanese Laid-Open Patent Publication No. 2003-17029, the part in which the weld strength is lowed by thinning a part of the outer periphery of the lid is provided at one end of the longitudinal part of the battery upper face. Therefore, although the part having lower weld strength is not easily broken when the battery is left unused for a long period, the strength at the one end of the longitudinal part of the battery upper face is not sufficient and when impact is applied to the one side of the battery in the lateral direction because of drop of the battery, the thin part of the lid is easily deformed and broken.

SUMMARY OF THE INVENTION

Thus, it is an object of the present invention to provide a sealed prismatic battery in which when a lid is welded to an upper opening of a battery casing, weld strength is partially lowered so as to be appropriately prevented from exploding and strength of battery is sufficiently provided against an impact caused by fall or the like.

According to an aspect of the present invention, there is provided a sealed prismatic battery including: a battery casing having a cylindrical shape of body with a bottom part and an upper opening, the upper opening having laterally long shape in which the thickness dimension is smaller than the width; and a lid which fits in the upper opening of the battery casing, the lid having laterally long shape in which the back-and-forth width dimension is smaller than the lateral length, and the outer periphery of the lid being welded to the periphery of the upper opening to form a welded portion; wherein the welded portion includes at least one fragile part having low weld strength and formed at the end of at least one of two long sides of the welded portion which are parallel to each other.

Preferably the welded portion includes a pair of fragile parts having low weld strength and formed at the ends of two long sides of the welded portion which are parallel to each other, respectively, and the pair of the fragile parts is diagonally positioned on the upper face of the battery casing.

It is also preferable that a ratio of a length dimension of the fragile part to a length dimension of the long side is in a range of 15 to 50%.

It is also preferable that a ratio of a depth of welded seam of the fragile part to a depth of welded seam of welded portion other than the fragile part in the entire welded portion is in a range of 40 to 80%.

BRIEF DESCRIPTION OF THE DRAWINGS

These and other objects and features of the present invention will become clear from the following description taken in conjunction with the preferred embodiments thereof and the accompanying drawings throughout which like parts are designated by like reference numerals, and in which.

DETAILED DESCRIPTION OF THE PREFERRED EMBODIMENTS

This application is based on application No. 2003-392558 filed 2003. Nov. 21 in Japan, the content of which is incorporated hereinto by reference.

Figure 1:
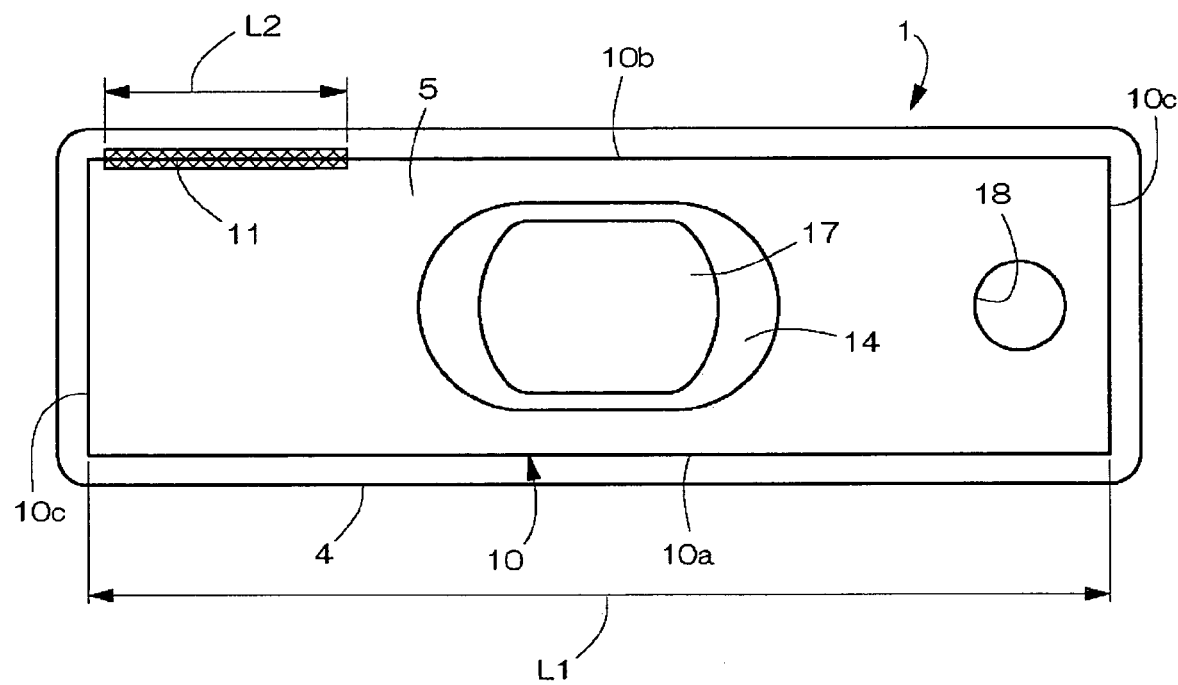
FIG. 1 is a plan view of an example of a sealed prismatic battery according to the present invention.
Figure 2:
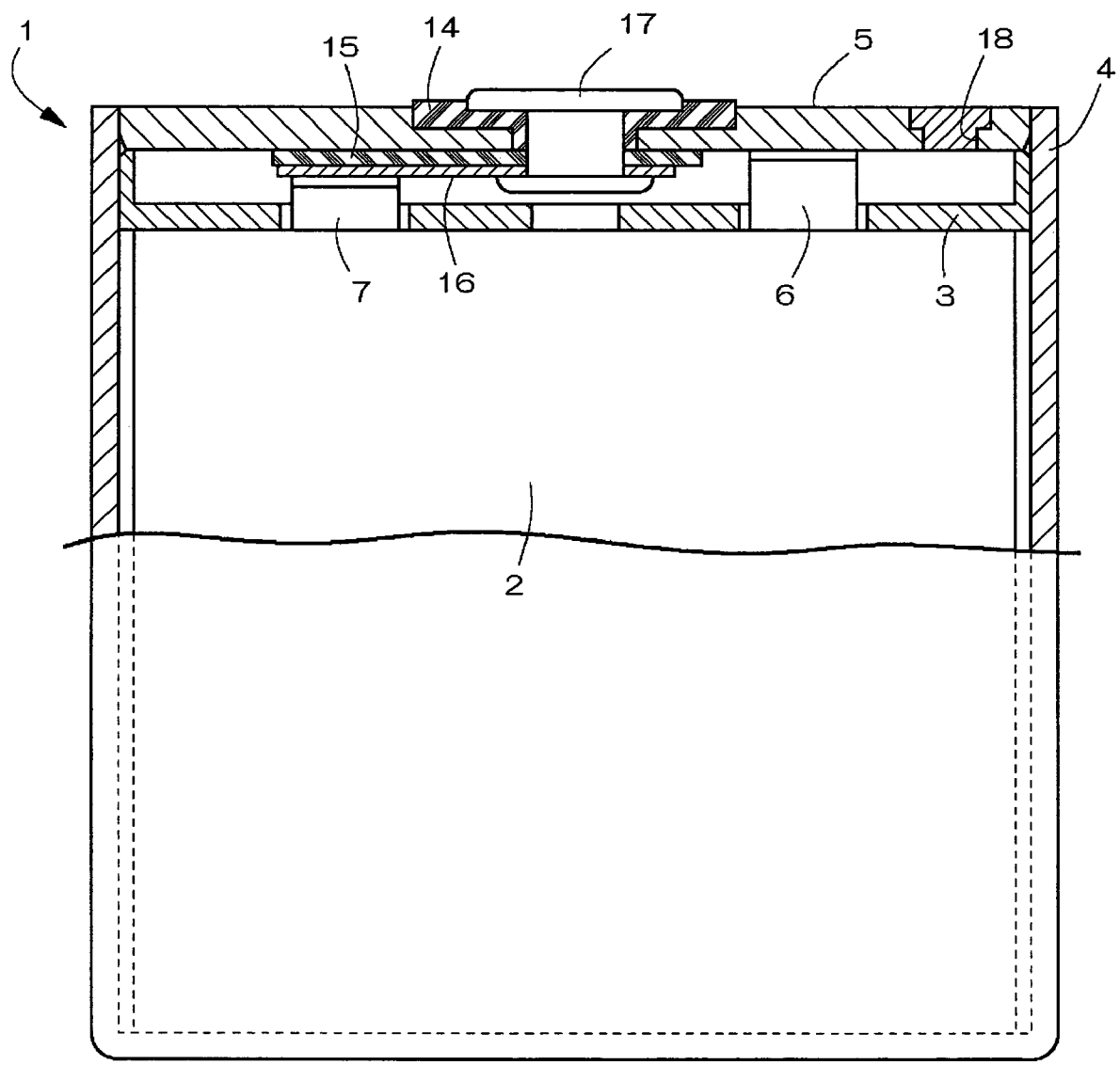
FIG. 2 is a partially notched front view showing the battery of FIG. 1.
Figure 9:
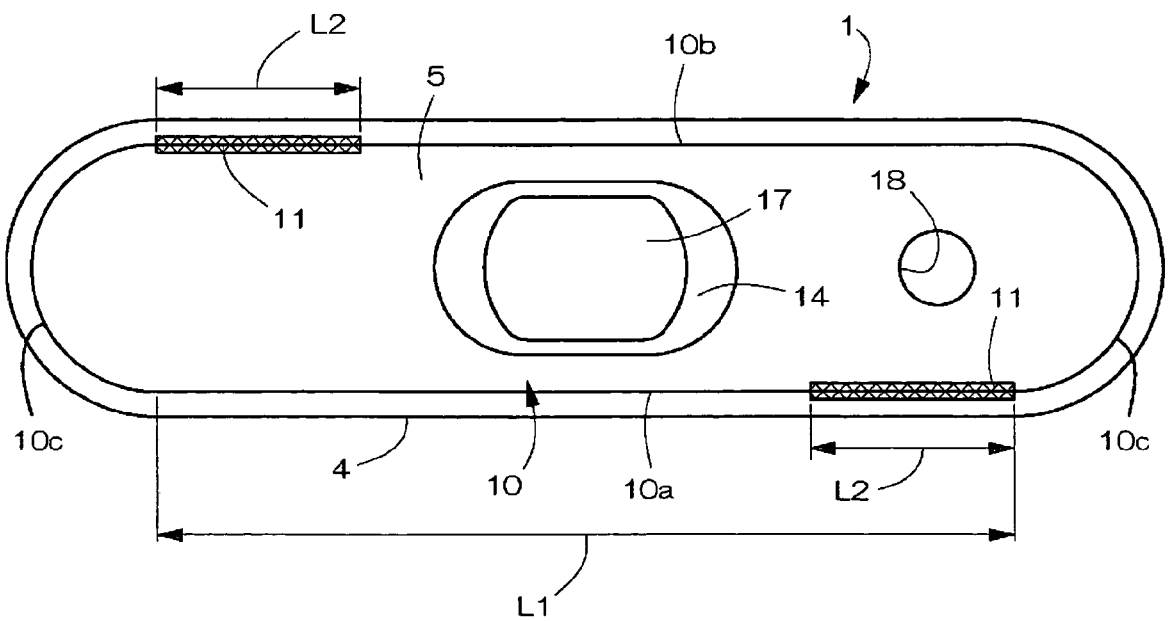
FIG. 9 is a plan view showing another example of a sealed prismatic battery.

One example of the present invention is shown in FIGS. 1 and 2, A sealed prismatic battery according to the present invention includes a battery casing 4 having a cylindrical shape of body with a bottom part and an upper opening, and a lid 5 which fits in the upper opening of the battery casing 4. The opening of the battery casing 4 and the lid 5 have laterally long shape in which the back-and-forth width dimension is smaller than the lateral length. The outer periphery of the lid 5 is welded to the periphery of the upper opening of the battery casing 4, thereby to form a welded portion. Here, the opening upper face of the battery casing 4 and the lid 5 have configurations including a case where a short side part 10c is linear as shown in FIG. 1 and a case where the short side part 10c is circular arc as shown in FIG. 9.

Figure 4:
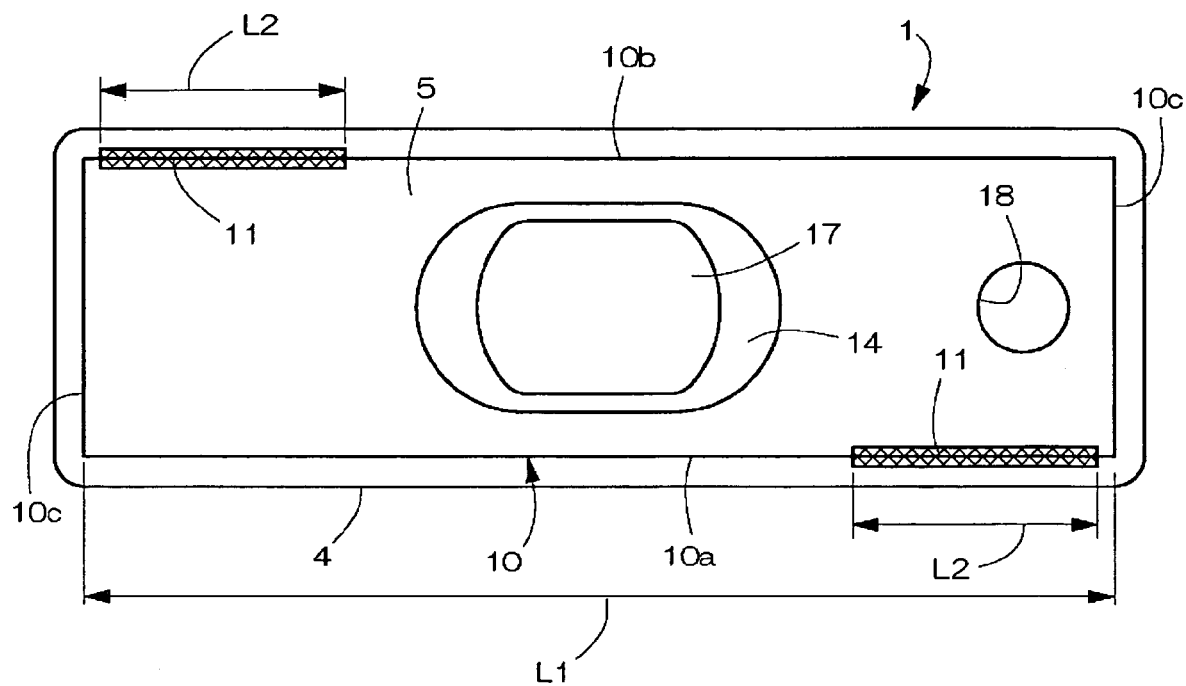
FIG. 4 is a plan view showing a sealed prismatic battery according to example 3.

As shown in FIG. 4, according to the present invention, it is characterized in that fragile parts 11 and 11 having low weld strength are formed at the ends of front and rear long side parts 10a and 10b, which are parallel to each other, in the lateral direction in a welded portion 10 between the battery casing 4 and the lid 5, and the fragile part 11 of the front long side part 10a and the fragile part 11 of the rear long side part 10b are diagonally positioned on the upper face of the battery casing 4. The above ends include not only the places in which the front and rear long side parts 10a and 10b cross the right and left short side parts 10c and 10c but also places which are moved from the places where the long side parts 10a and 10b cross the short side parts 10c and 10c toward the center of the long side parts 10a and 10b by 10% of a length dimension L1 of the long side parts 10a and 10b.

Here, the welding means laser welding or resistance welding. The fragile part 11 is formed by narrowing a bead width of welding or formed by decreasing a depth of welded seam. In the case of laser welding, the fragile part 11 can be formed by reducing an irradiation output of laser beams or reducing an irradiation time more as compared with other parts.

The fragile part 11 may be formed on either end of at least one of long side parts 10a and 10b which are parallel to each other in the lateral direction, in the welded portion 10 between the battery casing 4 and the lid 5.

More specifically, a ratio of a length dimension L2 of the fragile part 11 to a length dimension L1 of the long side parts 10a and 10b is preferably in a range of 15 to 50% and more preferably in a range of 20 to 50%. If the ratio of the length dimension L2 of the fragile part 11 to the length dimension L1 of the long side parts 10a and 10b is less than 15%, the fragile part 11 is not easily broken and even if the fragile part 11 is broken, its opening area is small, so that a release speed of the gas from the battery is not enough and appropriate explosion prevention effect cannot be obtained. Meanwhile, if the ratio is more than 50%, weld strength of the entire welded portion 10 is too low, so that the fragile part 11 is easily broken when the battery is left for a long period or when an impact is applied.

A ratio of a depth of welded seam of the fragile part 11 to a depth of welded seam of welded portions other than the fragile part 11 in the entire welded portion 10 is preferably in a range 40 to 80%. If the ratio is less than 40%, the weld strength is too low, so that the fragile part 11 is easily broken by an impact or the like. If the ratio is more than 80%, the welded portion other than the fragile part 11 could be broken prior to the fragile part 11. In this case, since an apparatus housing the battery is designed to have a gas release path, assuming that the gas and the like in the battery is released from the fragile part 11, if the gas is released from a broken part other than the fragile part 11, the gas is not appropriately released.

According to the present invention, since the battery can be prevented from exploding by simply changing the process such that weld strength is lowered at a part of the welded portion 10, it is not necessary to form a thin part for explosion prevention in the battery casing 4 or the lid 5 through a pressing or cutting process. As a result, the battery can be easily manufactured.

Even when the gas is accumulated in the battery because the battery is left unused for a long period and the front and rear walls of the battery casing 4 are pressed outwardly and the stress is converged to the center of the upper face of the battery casing 4, since the fragile part 11 is formed at the end of the upper face of the battery casing 4 in the lateral direction, the fragile part 11 is not easily broken by the above stress. As a result, even when the battery is left unused for a long period, the fragile part 11 is prevented from being broken erroneously. Furthermore, when the battery internal pressure is increased abruptly, the lid 5 is largely bent near the longitudinal side ends. Since stress is converged near the ends, the fragile part 11 can be surely broken using this stress, so that the battery can be surely prevented from exploding.

Thus, when the fragile parts 11 and 11 are diagonally provided at the upper face of the battery casing 4, since the fragile parts 11 and 11 are discretely positioned in the lateral direction, strength against an impact such as fall of the battery can be sufficiently obtained.

EXAMPLE 1

FIG. 2 shows example of a sealed prismatic battery according to the present invention. An electrode body 2 and a non-aqueous electrolyte are housed in a prismatic-shaped thin type of battery case 1 in which a back-and-forth width dimension is smaller than a vertical height dimension and a lateral length dimension. An insulator 3 made of plastic is positioned at an upper end in the battery case 1. More specifically, the lateral length dimension is 18 mm, the back-and-forth width dimension is 5 mm, and the vertical height dimension is 20 mm in the battery case 1.

The battery case 1 includes a prismatic cylindrical battery casing 4 having a bottom part and an upper opening, and a prismatic-shaped lid 5 which fits in the upper opening of the battery casing 4. The battery casing 4 is formed by deep-draw processing an aluminum plate, and four corners at a front side and a rear side are formed in circular arc shape.

The electrode body 2 is formed such that a positive electrode and negative electrode are spirally wound around with a separator provided between them and the whole is deformed into flat prismatic on cross section so as to coincide with a sectional configuration of the battery case 1. A positive and a negative electrode collector leads 6 and 7 extend upwardly from the positive and the negative electrodes of the electrode body 2, respectively.

The lid 5 is a press molded part including an aluminum alloy plate, and its outer periphery is hermetically sealed and welded to the periphery of the upper opening of the battery casing 4 with laser. As shown in FIG. 1, the opening of the battery casing 4 and the lid 5 are laterally long in which back-and-forth width dimensions are smaller than lateral length dimensions.

A welded portion 10 between the lid 5 and the battery casing 4 is set at a laterally long prismatic frame along a boundary between the outer periphery of the lid 5 and the opening periphery of the battery casing 4. A fragile part 11 having lower weld strength than other parts is provided at one end (the left side in FIG. 1) in the lateral direction in one long side part 10b (rear side) of the front and rear long parts 10a and 10b.

As shown in FIG. 2, a negative electrode terminal 17 is mounted at the center of the lid 5 so as to penetrate through an insulating packing 14, a lid insulation plate 15 and a hold plate 16. An injection hole 18 is provided at a lateral end of the lid 5 and the electrolyte is injected into the battery case 1 through the injection hole 18. The injection hole 18 is sealed after the electrolyte is injected.

The negative electrode collector lead 7 is welded to an inner face of the hold plate 16. The hold plate 16 is an electrically conductive metal plate and is conducted to the negative electrode terminal 17. The positive electrode collector lead 6 is welded to an inner face of the lid 5 between the lid insulation plate 15 and the injection hole 18. Thus, the positive electrode collector lead 6 is conducted to the battery case 1 and the battery case 1 serves as a positive electrode terminal. A thickness dimension of the lid 5 is 1.0 mm.

When the battery is assembled, the electrode body 2 and the insulator 3 are mounted in the battery casing 4, the negative electrode terminal 17, the insulating packing 14, the lid insulation plate 15 and the hold plate 16 are integrally assembled on the lid 5, the negative electrode collector lead 7 is welded to the inner face of the hold plate 16, and the positive electrode collector lead 6 is welded to the inner face of the lid 5. The positive electrode collector lead 6 may be welded to a long side inner face of the side face of the battery casing 4.

Then, the lid 5 is set in the upper opening of the battery casing 4 and seam welding is performed along the open periphery of the battery casing 4 and the outer periphery of the lid 5 in the shape of a laterally long prismatic frame with laser. At this time, the fragile part 11 is formed at the long side part 10b on the rear side of the welded portion 10. Then, the non-aqueous electrolyte is injected from the injection hole 18 into the battery case 1 and the injection hole 18 is sealed, whereby the battery is completed.

The welding at the fragile part 11 was performed by setting an irradiation output of laser beams at 85 W. The welding at the part other than the fragile part 11 was performed by setting the irradiation output of the laser beam at 150 W. Thus, a bead width dimension is 0.4 mm and depth of welded seam is 0.1 mm at the fragile part 11. Meanwhile, a bead width dimension is 0.5 mm and depth of welded seam is 0.18 mm at the welded portion other than the fragile part 11. That is, a ratio of the depth of welded seam of the fragile part 11 to that of the welded portion other than the fragile part 11 is almost 56%.

The fragile part 11 extends from a point apart from one short side part 10c (left side in FIG. 1) by 1 mm toward the right and its lateral length dimension L2 is 5 mm. That is, since a length dimension L1 of the long side parts 10a and 10b is 17.5 mm, the ratio of the lateral length dimension L2 of the fragile part 11 to the lateral length dimension L1 is about 29%.

The fragile part 11 may be formed by reducing either the bead width or the depth of welded seam. The fragile part 11 may be formed by reducing an irradiation time of the laser beams.

Figure 3:
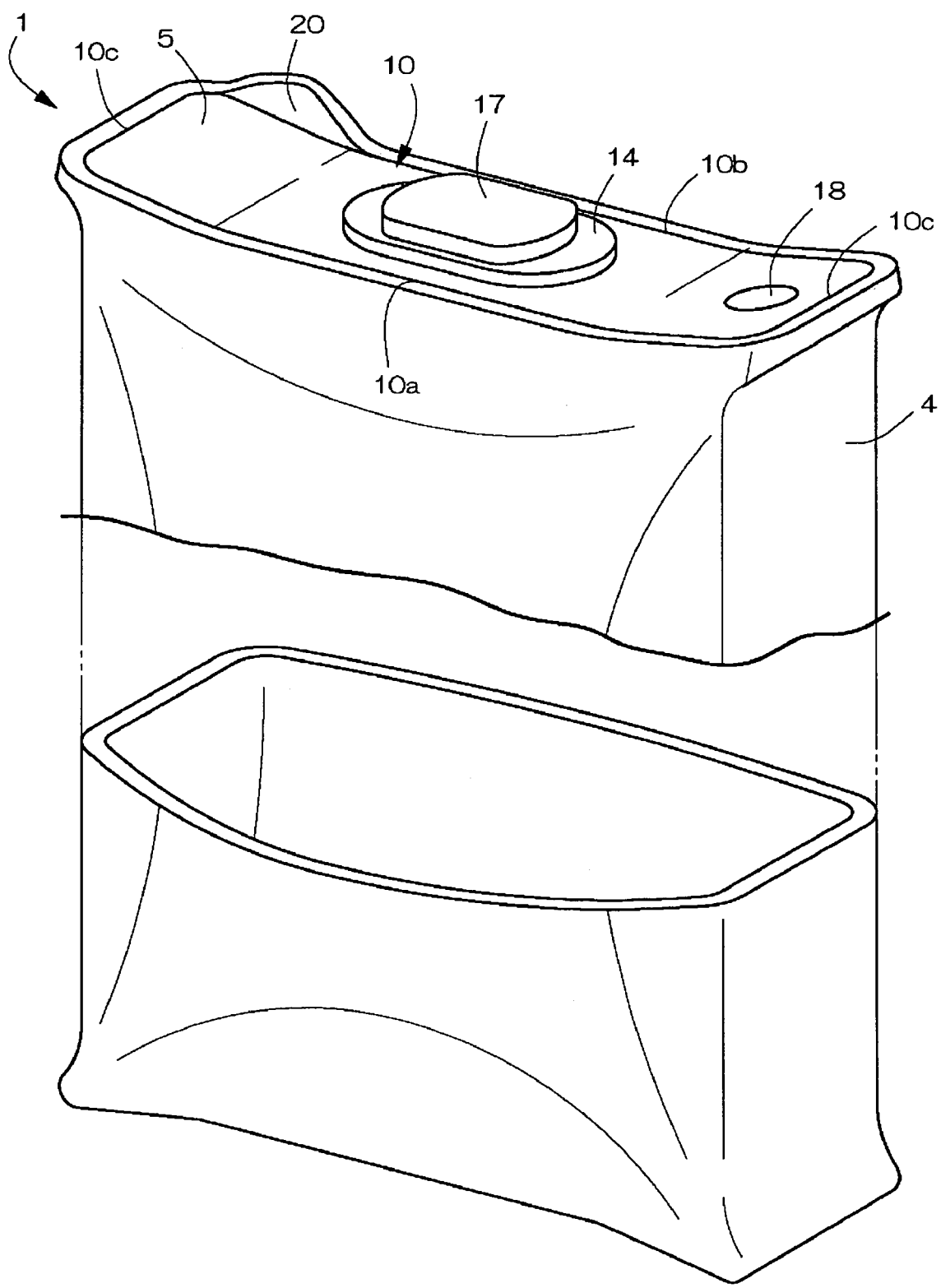
FIG. 3 is a perspective view showing a state in which the battery of FIG. 1 is swollen abnormally.

When gas is generated in the battery because of overcharging and the like and a battery internal pressure is abnormally increased beyond a predetermined value, the battery case 1 is swollen and deformed. When the battery case 1 is expanded to a limiting point, the fragile part 11 is broken prior to the welded portion other than the fragile part 11 as shown in FIG. 3. Thus, the gas in the battery is discharged from the broken part, so that the battery is prevented from exploding.

EXAMPLE 2

According to an Example 2, the fragile part 11 is formed by setting an irradiation output of laser beams which is increased to 100 W. That is, a bead width dimension of the fragile part 11 is 0.43 mm and a depth of welded seam thereof is 0.14 mm. Thus, the depth of welded seam of the fragile part 11 to a depth of welded seam of a welded portion other than the fragile part 11 is almost 78%. Since other points are the same as those in the Example 1, their descriptions are omitted.

EXAMPLE 3

According to an Example 3, as shown in FIG. 4, fragile parts 11 and 11 are formed at each end of the front and rear long side parts 10a and 10b in the lateral direction. The fragile part 11 of the front long-part 10a and the fragile part 11 of the rear long-part 10b are diagonally provided in an upper face of the battery case 1.

Each fragile part 11 extends from a position apart from the short side part 10c by 1 mm in the lateral direction and its lateral length dimension L2 is 5 mm. That is, a ratio of the lateral length dimension L2 of the fragile part 11 to a lateral length dimension L1 of 17.5 mm of the long side parts 10a and 10b is about 29%. Each fragile part 11 is formed by setting an irradiation output of laser beams at 85 W, and a ratio of a depth of welded seam of each fragile part 11 to a depth of welded seam of a welded portion other than the fragile part 11 is about 56%.

Figure 5:
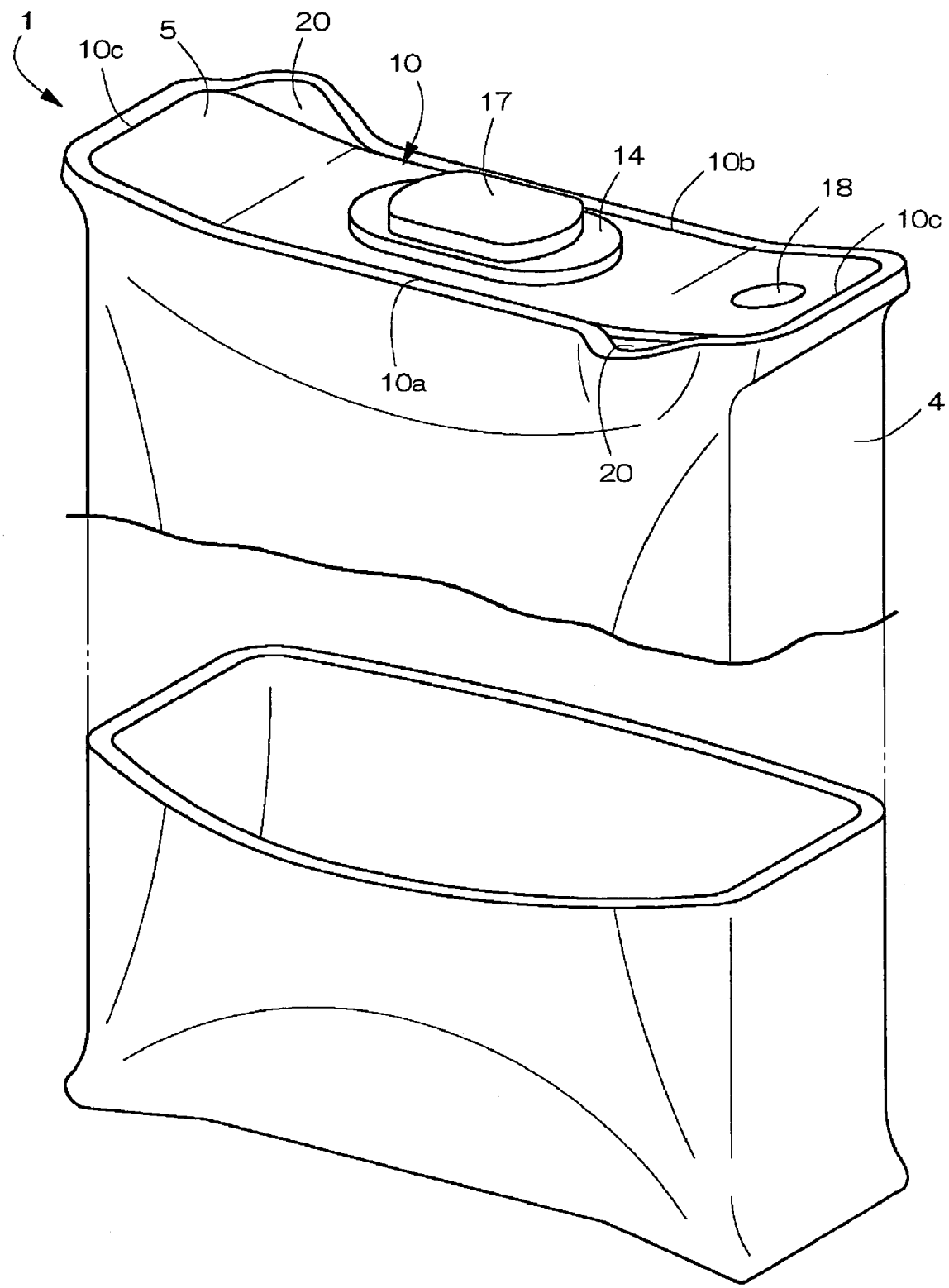
FIG. 5 is a perspective view showing a state when the battery according to example 3 is swollen abnormally.

When internal pressure exceeds a predetermined value and the battery case 1 is expanded and deformed, the fragile parts 11 and 11 are broken prior to the welded portion other than the fragile parts 11 and 11 as shown in FIG. 5. Thus, gas in the battery is discharged from the broken parts 20 and 20, so that the battery is prevented from exploding. When either one of the fragile parts 11 and 11 is broken, since the gas in the battery can be discharged, both fragile parts 11 and 11 are not necessarily broken at the same time. Since other points are the same as those in the Example 1, their descriptions are omitted.

EXAMPLE 4

According to an Example 4, the length dimension L2 of each of the diagonally positioned fragile parts 11 and 11 in the Example 3 is increased to 8.5 mm. That is, a ratio of the length dimension L2 of the fragile part 11 to a length dimension L1 of long side parts 10a and 10b is almost 49%. Since other points are the same as those in the Example 3, their descriptions are omitted.

EXAMPLE 5

An Example 5 is almost the same as the Example 3 except that in the Example 5 a lateral length dimension is 34 mm, a back-and-forth width dimension 5 mm and a vertical height dimension is 50 mm are set in a battery case 1 and an electrode body 2 is set larger because the battery size is increased.

According to the Example 5, fragile parts 11 and 11 are diagonally formed at each end of the long side parts 10a and 10b in the lateral direction like in the Example 3. Each fragile part 11 extends from a position apart from a short side part 10c by 1 mm in the lateral direction and its lateral length dimension L2 is 10 mm. That is, a ratio of the lateral length dimension L2 of the fragile part 11 to a lateral length dimension L1 of 33.4 mm of the long side parts 10a and 10b is about 30% like in the Example 3. Since other points are the same as those in the Example 1, their descriptions are omitted.

Comparative Example 1

According to a Comparative Example 1, an outer periphery of a lid 5 and an open periphery of a battery casing 4 were welded over the entire periphery at the same weld strength without providing a fragile part 11. Other points are the same as those in the Example 1.

Comparative Example 2

According to a Comparative Example 2, the length dimension L2 of the fragile part 11 in the Example 1 was increased to 10 mm. That is, a ratio of a length dimension L2 of a fragile part 11 to a length dimension L1 of long side parts 10a and 10b is almost 57%. Other points are the same as those in the Example 1.

Comparative Example 3

According to a Comparative Example 3, the length dimension L2 of the fragile part 11 in the Example 1 was decreased to 2 mm. That is, a ratio of a length dimension L2 of a fragile part 11 to a length dimension L1 of long side parts 10a and 10b is almost 12%. Other points are the same as those in the Example 1.

Comparative Example 4

According to a Comparative Example 4, the irradiation output of the laser beams in the Example 1 was decreased 70 W to form a fragile part 11. That is, a bead width dimension of the fragile part 11 is decreased to 0.38 mm and a depth of welded seam is decreased to 0.07 mm, and a ratio of the depth of welded seam of the fragile part 11 to a depth of welded seam at a welded portion other than the fragile part 11 is almost 39%. Other points are the same as those in the Example 1.

Comparative Example 5

Figure 6:
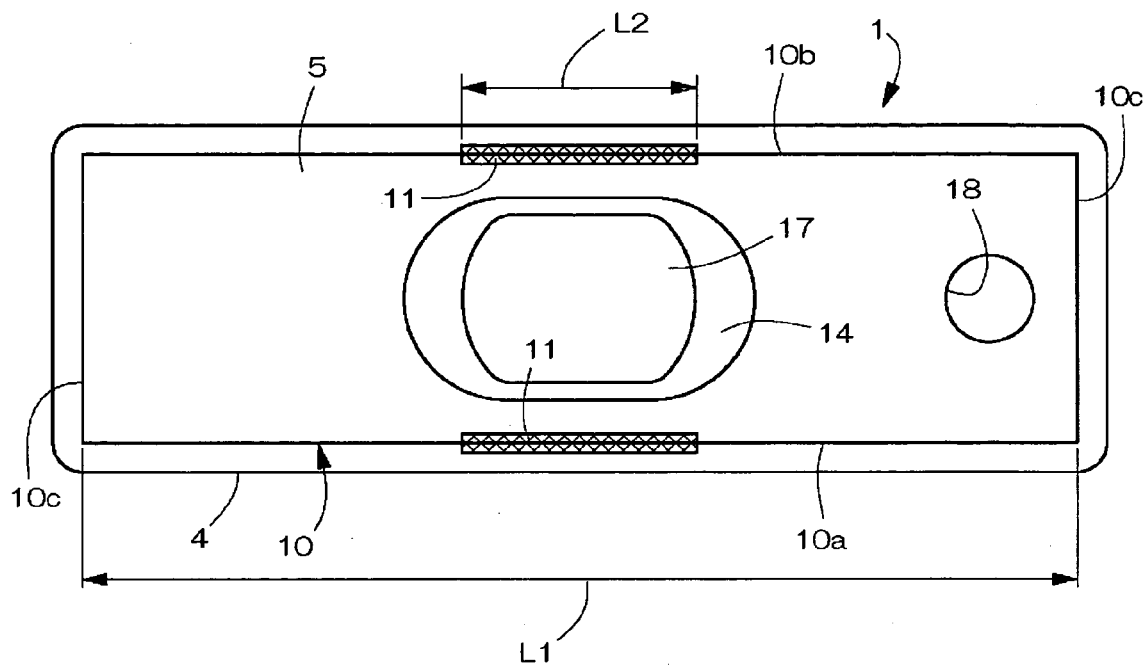
FIG. 6 is a plan view showing a sealed prismatic battery according to comparative example 5.

According to a Comparative Example 5, as shows in FIG. 6, fragile parts 11 and 11 were formed so as to be opposed to each other at each central part of the front and rear long side parts 10a and 10b in the lateral direction. A length dimension L2 of the fragile part 11 is 5 mm. Other points are the same as those in the Example 3.

Comparative Example 6

Figure 7:
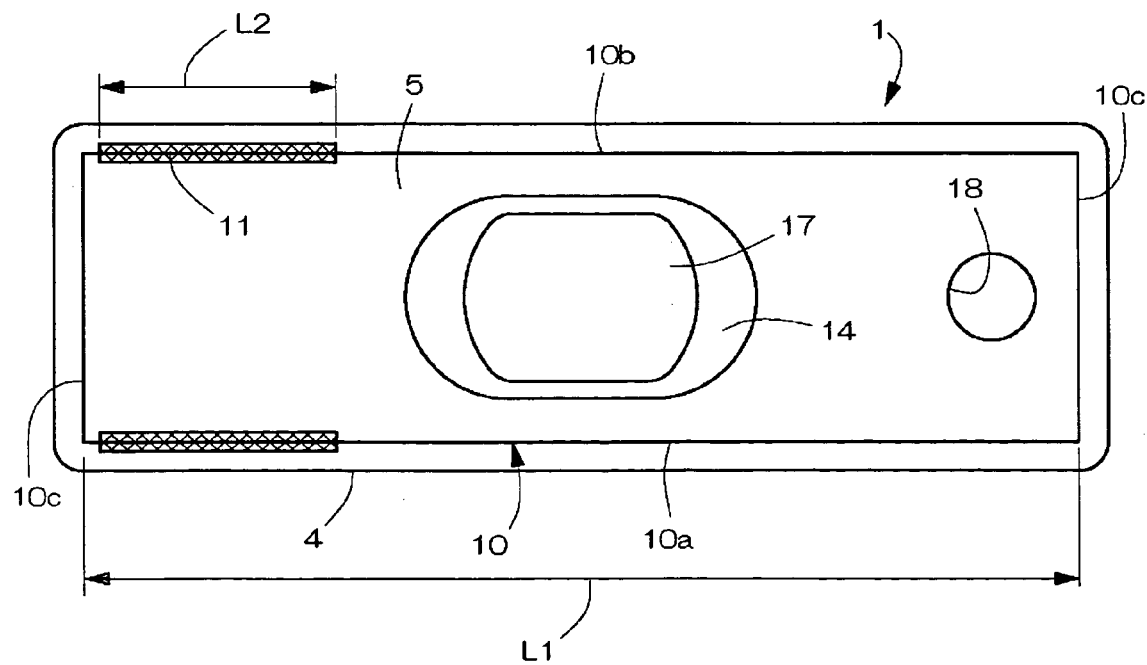
FIG. 7 is a plan view showing a sealed prismatic battery according to comparative example 6.

According to a Comparative Example 6, as shown in FIG. 7, fragile parts 11 and 11 were formed so as to be opposed to each other at one end (left side in FIG. 7) of front and rear long-parts 10a and 10b in the lateral direction. Other points are the same as in the Example 3.

Comparative Example 7

Figure 8:
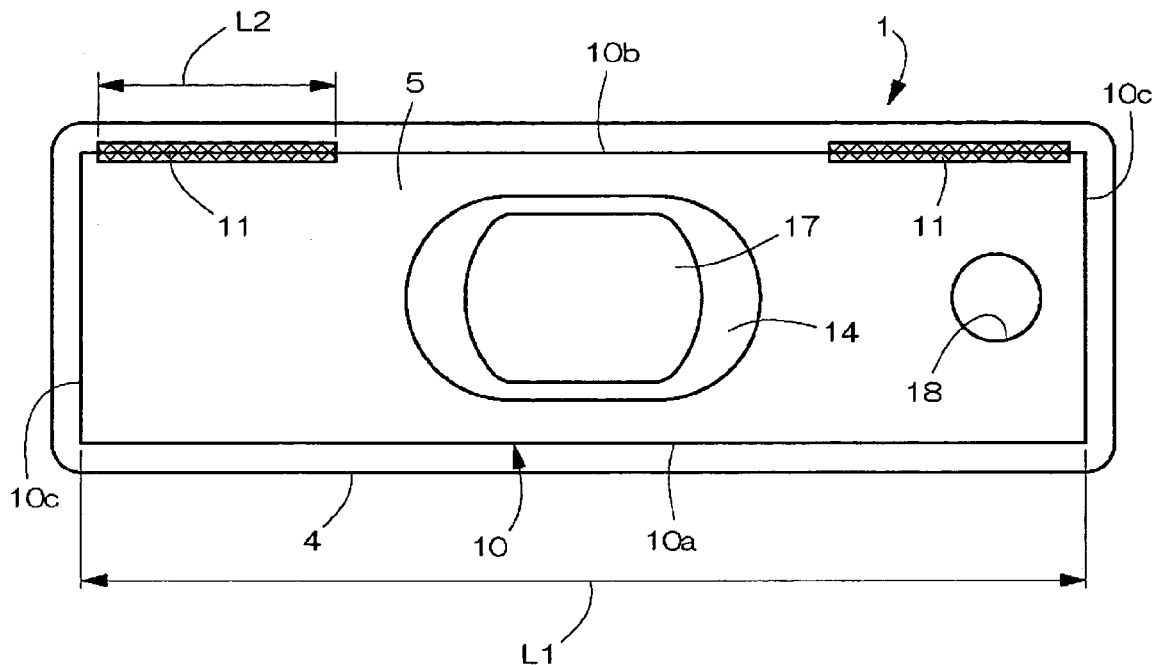
FIG. 8 is a plan view showing a sealed prismatic battery according to comparative example 7.

According to a Comparative Example 7, as shown in FIG. 8, fragile parts 11 and 11 were arranged at a rear long-part 10b so as to be apart from right and left short side parts 10c and 10c by 1 mm, respectively. Other points are the same as those in the Example 3.

Test

There were prepared 20 batteries for each of the Examples 1 to 5 and 20 batteries for each of the Comparative Examples 1 to 7, and a drop test was performed in which each of 20 batteries was dropped from a height of 1.5 m 20 times with the negative electrode terminal 17 being on the lower side and each of 20 batteries is dropped from a height of 1.5 m 20 times with the negative electrode terminal 17 being on the upper side. Then, it was examined whether cleavage was generated at the fragile part 11 of each battery.

In addition, there were prepared 20 batteries for each of the Examples 1 to 5 and 20 batteries for each of the Comparative Examples 1 to 7, and each battery was charged up to 4.2V and then an overcharge test of 12V was performed at 1.0 C. Then, it was examined whether explosion or ignition was generated in each battery. The above results are shown in Table 1.

TABLE 1

| | The number of batteries having cleavage at fragile part | | |
|---|---|---|---|
| | Negative electrode terminal is on the lower side | Negative electrode terminal is on the upper side | The number of batteries exploded or ignited |
| Example 1 | 0/20 | 0/20 | 0/20 |
| Example 2 | 0/20 | 0/20 | 0/20 |
| Example 3 | 0/20 | 0/20 | 0/20 |
| Example 4 | 0/20 | 0/20 | 0/20 |
| Example 5 | 0/20 | 0/20 | 0/20 |
| Comparative Example 1 | 0/20 | 0/20 | 19/20 |
| Comparative Example 2 | 2/20 | 1/20 | 1/20 |
| Comparative Example 3 | 0/20 | 0/20 | 8/20 |
| Comparative Example 4 | 4/20 | 2/20 | 0/20 |
| Comparative Example 5 | 5/20 | 2/20 | 3/20 |
| Comparative Example 6 | 2/20 | 0/20 | 0/20 |
| Comparative Example 7 | 1/20 | 1/20 | 0/20 |

As shown in Table 1, according to the Examples 1 to 5, there was no cleavage at the fragile part 11 in all of the batteries in the drop test and there was also no explosion and ignition in the overcharge test. In the Comparative Example 1, since there is no fragile part provided, there was no cleavage at the fragile part 11 in all of the batteries in the drop test, but the explosions or ignitions were generated in the 19 batteries out of 20 in the overcharge test.

According to the Comparative Example 2, although the explosion and the like was generated in only one battery out of 20 in the overcharge test, cleavages at the fragile parts 11 were generated in the 2 batteries output 20 when each battery was dropped with the negative electrode terminal 17 being on the lower side and in the 1 battery out of 20 when the battery was dropped with the negative electrode terminal 17 being on the upper side in the drop test. This is thought that the fragile part 11 is likely to be split because the length of the fragile part 11 is increased.

According to the Comparative Example 3, there was no cleavage at the fragile part 11 in all of the batteries in the drop test because the length of the fragile part 11 was reduced and the strength of the welded portion 10 was increased for that. However, the explosions and the like were generated in the 8 batteries out of 20 in the overcharge test.

According to the Comparative Example 4, although the explosion or the ignition was not generated in the overcharge test, the cleavages at the fragile parts 11 were generated in the 4 batteries out of 20 when the negative electrode terminal 17 was on the lower side and in the 2 batteries out of 20 when the negative terminal 17 was on the upper side because the irradiation output of the laser beams was reduced and the weld strength of the welded portion 10 was lowered for that.

According to the Comparative Example 5, the cleavages at the fragile parts 11 were generated in the 5 batteries out of 20 when the negative terminal 17 was on the lower side and in the 2 batteries out of 20 when the negative terminal 17 is on the upper side in the drop test. This is thought that since the fragile parts 11 were positioned at the centers of the long side parts 10a and 10b in the lateral direction, the center of the upper face of the battery was largely bent when the battery was dropped, so that the fragile part 11 was easily split.

In addition, according to the Comparative Example 5, the explosions were generated in the 3 batteries out of 20 in the overcharge test. This is thought that even if the battery casing 4 was expanded when gas pressure was increased in the battery because of the overcharge, its stress was converged to the ends on the side of the battery upper face in the lateral direction, and the stress generated in each fragile part 11 provided at the center of the battery upper face is not increased.

According to the Comparative Example 6, although the explosion and the like was not generated in the overcharge test, the cleavages at the fragile parts 11 were generated in the 2 batteries out of 20 when the negative terminal 17 was on the lower side in the drop test. This is thought that since the two fragile parts 11 and 11 were opposed to each other at the ends of the long side parts 10a and 10b in the lateral direction, the strength of the end parts in the lateral direction was reduced.

According to the Comparative Example 7, although the explosions and the like was not generated in the overcharge test, the cleavage at the fragile part 11 was generated in the 1 battery out of 20 when the negative terminal 17 was on the lower side and in the 1 battery out of 20 when the negative terminal 17 was on the upper side. This is thought that since the two fragile parts 11 and 11 were provided at the ends of the rear long side parts 10b in the lateral direction, the strength of the rear long side part 10b was reduced.

The right and left short side parts 10c of the welded portion 10 may be circular arc as show in FIG. 9. The welding may be resistance welding.

Although the present invention has been described in connection with the preferred examples thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A sealed prismatic battery, comprising:
a battery casing having a cylindrically shaped body with a bottom part and an upper opening, the upper opening having a laterally long shape in which the back-and-forth width dimension is smaller than the lateral length dimension; and
a lid which fits in the upper opening of the battery casing, the lid having a laterally long shape in which the back-and-forth width dimension is smaller than the lateral length, and having no thin part and the outer periphery of the lid being welded to the periphery of the upper opening to form a welded portion;
wherein the welded portion includes a pair of fragile parts having low weld strength disposed in two long sides of the welded portion and formed at the ends of said two long sides of the welded portion which are parallel to each other, respectively, and wherein the pair of the fragile parts is diagonally positioned on the upper face of the battery casing, and
wherein the ends of two long sides include not only the places where the two long sides of the welded portion cross two short sides of the welded portion but also places which extend from the places where the long sides cross the short sides toward the center of the long sides by 10% of the length dimension of the long sides, and wherein a ratio of a length dimension of the fragile part to a length dimension of the long side is in a range of 15 to 50%, and wherein the two short sides of the weld portion are linear or have a circular arc configuration.

2. The sealed prismatic battery according to claim 1, wherein a ratio of a depth of welded seam of the fragile part to a depth of welded seam of welded portion other than the fragile part in the entire welded portion is in a range of 40 to 80%.

* * * * *